(12) United States Patent
Tani et al.

(10) Patent No.: US 7,080,551 B2
(45) Date of Patent: Jul. 25, 2006

(54) FLUID VOLUME MEASURING APPARATUS WITH BUBBLE IN FLUID

(75) Inventors: Hiroki Tani, Kariya (JP); Makoto Yamaguchi, Kariya (JP); Tetsuji Kudo, Nukata-gun (JP); Koji Mizukusa, Chita-gun (JP)

(73) Assignee: Denso Corporation, Kariya (JP)

( * ) Notice: Subject to any disclaimer, the term of this patent is extended or adjusted under 35 U.S.C. 154(b) by 56 days.

(21) Appl. No.: 11/007,287

(22) Filed: Dec. 9, 2004

(65) Prior Publication Data

US 2005/0126278 A1    Jun. 16, 2005

(30) Foreign Application Priority Data

Dec. 15, 2003  (JP)  .............................. 2003-416256

(51) Int. Cl.
| F02M 65/00 | (2006.01) |
| G01M 3/02 | (2006.01) |
| G01M 3/26 | (2006.01) |
| G01F 13/00 | (2006.01) |

(52) U.S. Cl. .................... 73/119 A; 73/40; 73/47; 73/49.7; 73/861.47

(58) Field of Classification Search ............... 073/40, 073/46, 47, 49.1–49.8, 119 R, 119 A, 861.47, 073/861.49

See application file for complete search history.

(56) References Cited

U.S. PATENT DOCUMENTS

| 3,106,835 | A | * | 10/1963 | Henderson | ..................... 73/46 |
| 5,212,979 | A | | 5/1993 | Albrodt et al. | ................. 73/37 |
| 5,834,631 | A | * | 11/1998 | Yamaguti et al. | ............... 73/40 |

FOREIGN PATENT DOCUMENTS

JP         10-9991        1/1998

* cited by examiner

*Primary Examiner*—Hezron Williams
*Assistant Examiner*—David A. Rogers
(74) *Attorney, Agent, or Firm*—Nixon & Vanderhye P.C.

(57) ABSTRACT

A fluid volume measuring apparatus for measuring volume of fluid flowing out of a measured object includes a passage member that defines a measurement passage. The measurement passage is filled with fluid, which is capable of moving in the measurement passage in accordance with volume of fluid flowing out of the measured object. The fluid filled in the measurement passage forms a bubble. The passage member has a translucent portion in a predetermined measurement range, in which the bubble displaces in accordance with volume of fluid flowing out of the object to be measured. The translucent portion is formed of a translucent material. Volume of fluid, which flows out of the measured object, is measured in accordance with displacement of the bubble.

16 Claims, 3 Drawing Sheets

FLUID VOLUME MEASURING APPARATUS WITH BUBBLE IN FLUID

CROSS REFERENCE TO RELATED APPLICATIONS

This application is based on and incorporates herein by reference Japanese Patent Application No. 2003-416256 filed on Dec. 15, 2003.

FIELD OF THE INVENTION

The present invention relates to a fluid volume measuring apparatus that measures volume of fluid flowing out of an object to be measured.

BACKGROUND OF THE INVENTION

In the conventional fluid volume measuring apparatus according to U.S. Pat. No. 5,212,979 (JP-A-H4-255568), fluid level vertically displaces in a grass tube in accordance with a volume of fluid flowing out of an object to be measured (measured object). The fluid level is detected using a line camera to measure a volume of fluid flowing out of the measured object. In the conventional flow volume measuring apparatus according to JP-A-10-9991, variation of fluid level in a leakage-detecting pipe is detected as variation of pressure, so that a volume of fluid flowing out of the measured object is detected.

However, fluid level on the opening side of the grass tube or the leakage-detecting pipe needs to be completely returned to a standard position to measure a volume of the fluid in the above conventional structure. Fluid adheres to the inner wall face of the tube (pipe) when fluid level vertically downwardly displaces to the standard position in the tube. Therefore, the fluid level becomes unstable before the fluid, which adheres to the inner wall face of the tube, completely returns downward.

When measurement of the fluid level is started before the fluid adhering to the inner wall face of the tube completely returns downward, the fluid volume cannot be precisely measured. Accordingly, measurement of fluid volume needs to be halted until the fluid adhering to the inner wall face completely returns downward for precise measurement of fluid volume in the conventional structures. As a result, an interval between measurements is lengthened.

SUMMARY OF THE INVENTION

In view of the foregoing problems, it is an object of the present invention to produce a fluid volume measuring apparatus that is capable of measuring volume of fluid flowing out of an object to be measured within a short time.

According to the present invention, a fluid volume measuring apparatus for measuring volume of fluid flowing out of a measured object includes a passage member that defines a measurement passage. The measurement passage is filled with fluid, which is capable of moving in the measurement passage in accordance with volume of fluid flowing out of the measured object. The fluid filled in the measurement passage forms a bubble. The passage member has a translucent portion in a predetermined measurement range, in which the bubble displaces in accordance with volume of fluid flowing out of the object to be measured. The translucent portion is formed of a translucent material. Volume of fluid, which flows out of the measured object, is measured in accordance with displacement of the bubble.

Alternatively, a fluid volume measuring method, which is used for measuring volume of fluid flowing out of a measured object, includes the following procedures. An opening and closing means is opened to communicate a measurement passage, which is defined in a passage member and filled with fluid, with an atmosphere. Pressure in the measurement passage becomes atmospheric pressure, and a bubble defined in the fluid filled in the measurement passage returns to a standard position. A measured object is secured to the measurement passage. The opening and closing means is closed to airtightly enclose the measurement passage. Pressurized fluid is supplied into the measured object to apply predetermined pressure in the measured object. Displacement of the bubble from the standard position is detected. Volume of fluid, which flows out of the measured object, is calculated based on the displacement of the bubble. It is determined whether the calculated volume of fluid flowing out of the measured object is greater than a threshold.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

First Embodiment

Figure 1:
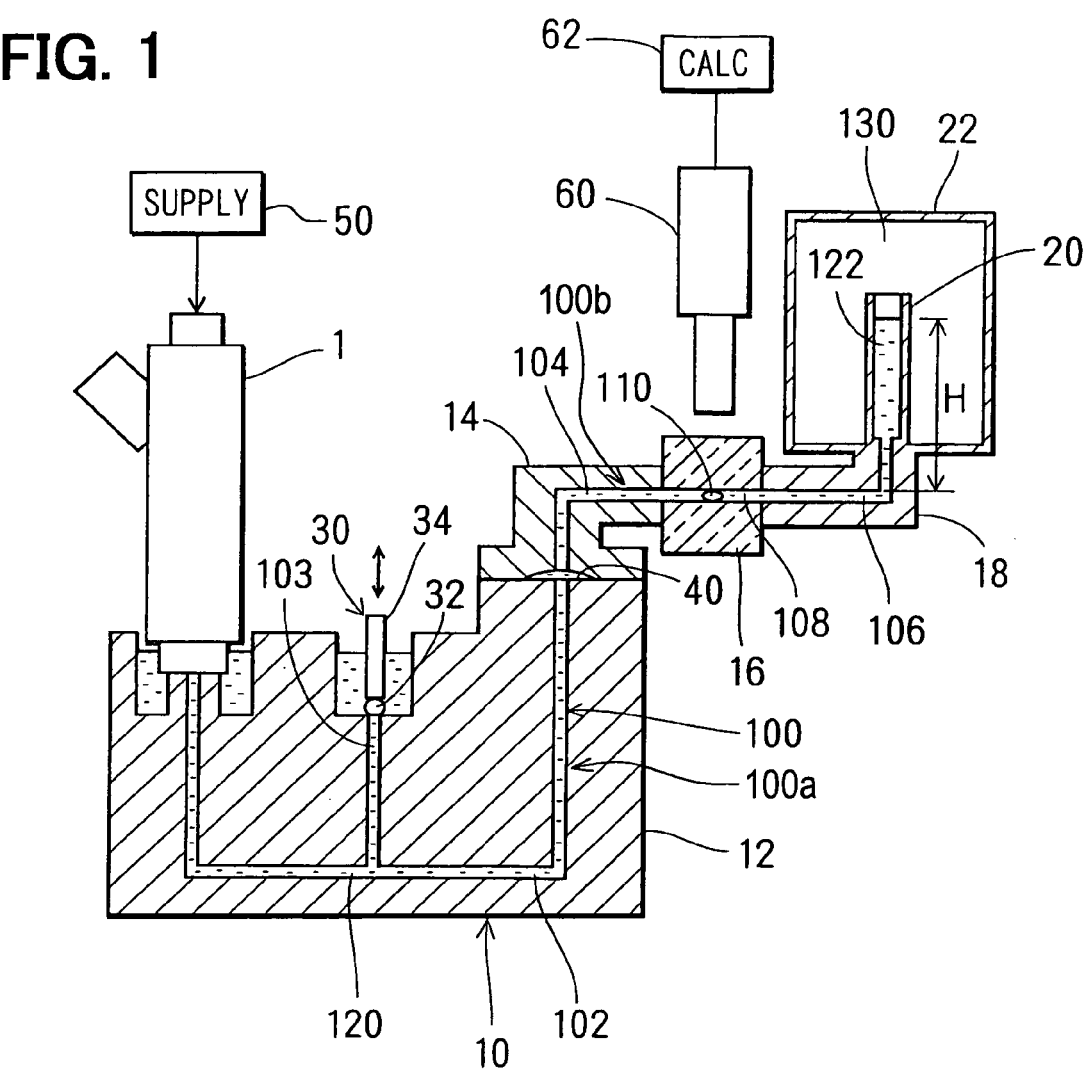
FIG. 1 is a schematic overview showing a fluid volume measuring apparatus according to a first embodiment of the present invention.

As shown in FIG. 1, a fuel injection valve 1, which is an object to be measured (measured object), is connected with a fluid volume measuring apparatus 10 that measures leaking volume LV of fluid flowing out of the fuel injection valve 1. The fuel injection valve 1 is used for a gasoline engine, for example. The fluid volume measuring apparatus 10 measures leaking volume LV of fluid, which leaks out of a seat portion of the fuel injection valve 1 when the fuel injection valve 1 is closed. The fluid volume measuring apparatus 10 includes passage members 12, 14, 16, 18, a manometer 20, an airtight case 22, an ON-OFF valve 30, a diaphragm 40, a fluid supply apparatus 50, a camera 60, and a calculating device 62.

The passage members 12, 14, 16, 18 and a manometer 20 construct a measurement passage 100. The measurement passage 100 includes measurement passages 102, 104, 106. The measurement passage 102 is formed in the passage member 12. The measurement passage 104 is formed in the passage members 14, 16 on the side of the fuel injection valve 1 with respect to a bubble 110. The measurement passage 106 is formed in the passage members 16, 18 and the manometer 20 on the opposite side as the fuel injection valve 1 with respect to the bubble 110. The measurement passage 102 has an opening passage 103, through which the measurement passage 102 communicates with the atmosphere. The passage member (translucent passage member) 16 is formed of a translucent material. The translucent passage member 16 internally forms a displacement measurement passage (displacement passage) 108. The measurement passage 100 is filled with a measurement fluid 120 to measure leaking volume LV of fluid leaking out of the fuel injection valve 1. The passage member 12 constructs one opening end side of the measurement passage 100, to which the fuel injection valve 1 is secured using a clamp (not shown). Connecting sections among the above members and components are sealed, so that the measurement fluid 120 does not leak from the connecting sections when the fuel injection valve 1 is secured to the fluid volume measuring apparatus 10.

Figure 3A:
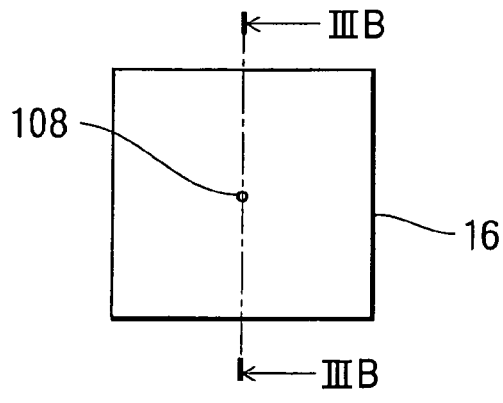
FIG. 3A is a front view showing a passage member.
Figure 3B:
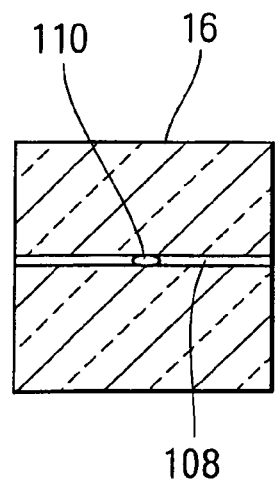
FIG. 3B is a cross-sectional side view showing the passage member.

As shown in FIGS. 3A, 3B, the translucent passage member 16 is formed of the translucent material, such as glass or an acrylic material. The displacement passage 108, which is substantially horizontally formed in the translucent passage member 16, is filled with measurement fluid, in which the bubble 110 is formed of air. The displacement passage 108 has a substantially circular cross section that has an inner diameter, which is preferably equal to or less than 1 mm such that the bubble 110 does not upwardly float in the displacement passage 108. The minimum inner diameter of the displacement passage 108 is determined such that the bubble 110 is capable of displacing in the displacement passage 108 having the minimum inner diameter.

The bubble 110 is capable of displacing in the displacement passage 108, which is several microns in the inner diameter, as long as the displacement passage 108 can be formed. The manometer 20 is a tube, in which liquid column of the measurement fluid is formed. The manometer 20 is located on the vertically upper side with respect to the displacement passage 108. Therefore, a fluid column (liquid column) 122 of the measurement fluid filled in the manometer 20 applies hydraulic pressure to the bubble 110 from the opposite side as the fuel injection valve 1. The fluid column 122 applies hydraulic pressure to the bubble 110 corresponding to the height H of the fluid column 122, so that the position of the bubble 110 can be restricted from fluctuating.

The airtight case 22 encloses the opening end side of the manometer 20, which is the other opening end side of the measurement passage 100 that is located on the opposite side as the fuel injection valve 1 with respect to the bubble 110. The airtight case 22 serves as a pressure maintaining means to hermetically seal atmosphere around the opening of the manometer 20 in the airtight case 22. Thus, the measurement passage 100 is not affected by flow or pressure fluctuation arising in the atmosphere outside of the airtight case 22. That is, the airtight case 22 maintains pressure applied from the atmosphere, which is on the other opening end side of the measurement passage 100, to the measurement fluid filled in the measurement passage 100 at a substantially constant pressure.

Therefore, the position of the bubble 110 can be restricted from fluctuating due to disturbance excluding fluid leaking out of the fuel injection valve 1. The ON-OFF valve 30 serves as an opening and closing means that is capable of communicating and shutting the opening passage 103, through which measurement passage 102 formed between the fuel injection valve 1 and the bubble 110 communicates with the atmosphere. The ON-OFF valve 30 includes a ball 32 and a piston 34, such that the piston 34 downwardly displaces to seat the ball 32 onto the opening passage 103, so that the opening passage 103 is shut. When the piston 34 upwardly displaces, the opening passage 103 is communicated with the atmosphere. The fluid level of the vertical position, in which the ON-OFF valve 30 is located, is set to be substantially the same as the fluid level of the vertical position, in which the fuel injection valve 1 is located.

Figure 2A:
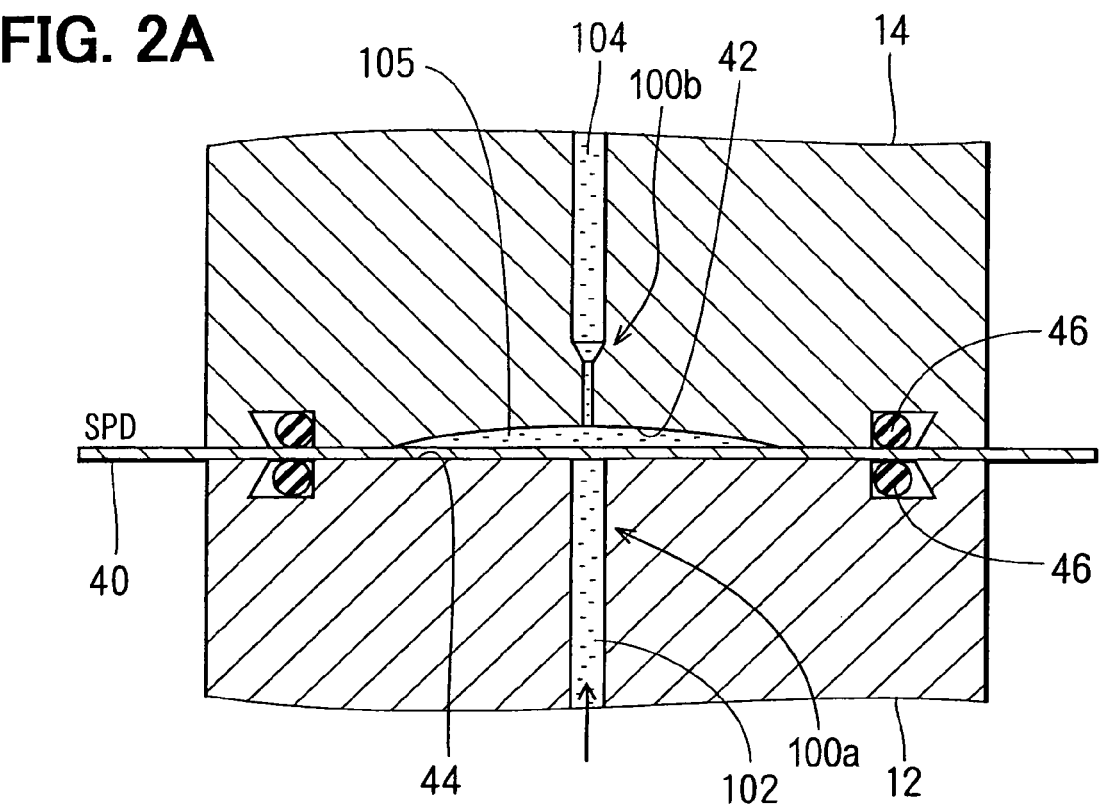
FIG. 2A is an enlarged cross-sectional side view showing a diaphragm before fluid flows out of an object to be measured.

As shown in FIG. 2, the diaphragm 40 is formed of a thin metallic plate, and is axially inserted between the passage members 12, 14. The diaphragm 40 partitions the measurement passage 100 into a first measurement passage 100a, which is on the side of the fuel injection valve 1, and a second measurement passage 100b, which is on the side of the bubble 110. The diaphragm 40 and the passage member 12 are sealed with an O-ring 46 therebetween. The diaphragm 40 and the passage member 14 are also sealed with an O-ring 46 therebetween. The passage member 14 forms a recession 42 that has a concave shape, in which a fluid chamber 105 is formed. The diaphragm 40 is mounted between an end face 44 of the passage member 12 and the recession 42 of the passage member 14. When the diaphragm 40 contacts onto the end face 44 or when the diaphragm 40 contacts onto the recession 42, displacement of the diaphragm 40 axially is restricted. The diaphragm 40, the recession 42 and the end face 44 serve as a volume restricting means. The recession 42 and the end face 44 serve as restricting members. The diaphragm 40 shown in FIG. 1 is located at the vertical position, which is set to be higher than the vertical position (fluid level), in which the fuel injection valve 1 and the ON-OFF valve 30 are located. The diaphragm 40 is set at the standard potion SPD shown in FIG. 2A when the fuel injection valve 1 does not leak and pressure is not applied in the first measurement passage 100a. The fluid supply apparatus 50 shown in FIG. 1 pressurizes measurement fluid and supplies the pressurized measurement fluid into the fuel injection valve 1. The camera 60 serves as a detecting device to detect the position of the bubble 110 in the displacement passage 108. The calculating device 62 calculates displacement DB of the bubble 110 in accordance with the position of the bubble 110 detected using the camera 60 to calculate leaking volume LV of fluid leaking out of the fuel injection valve 1.

Figure 4:
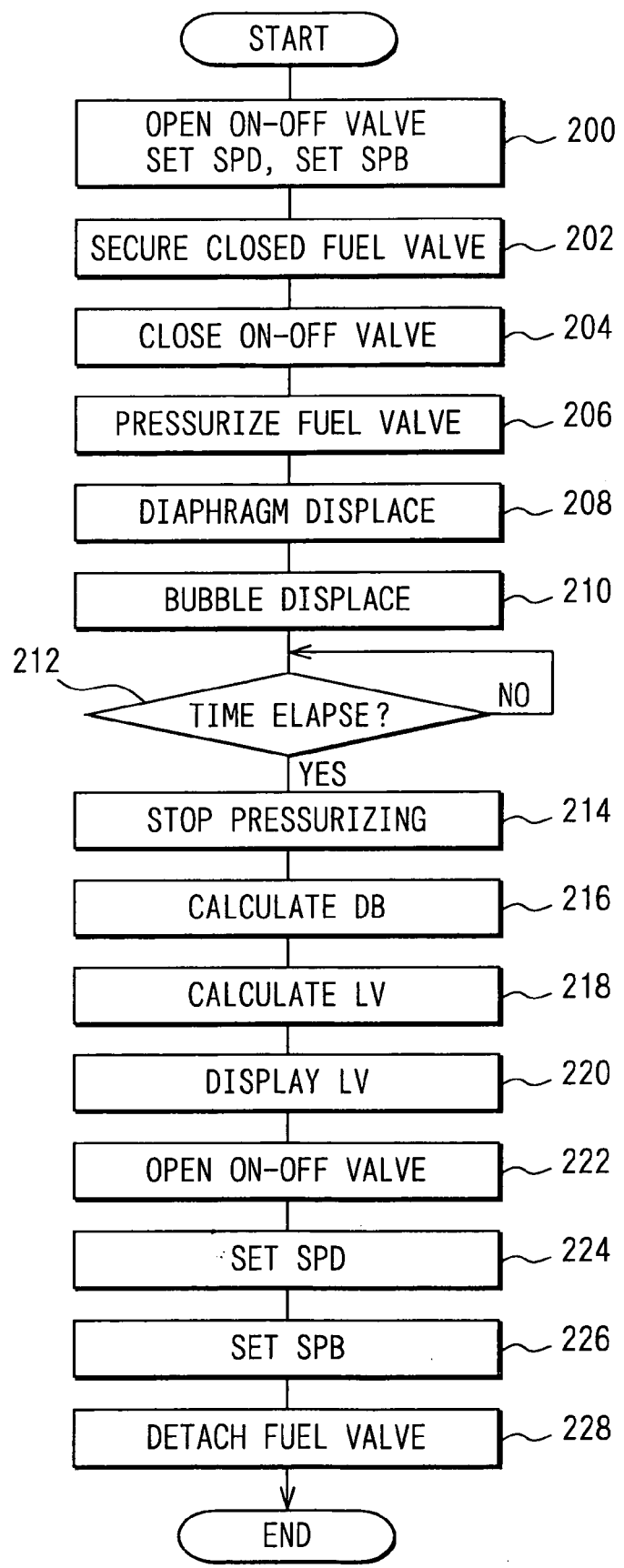
FIG. 4 is a flowchart showing a fluid volume measuring procedure.

Next, a procedure of measurement of leaking volume LV is described in accordance with FIG. 4.

At step 200, the ON-OFF valve 30 is opened, so that the measurement passage 102 is communicated with the atmosphere through the opening passage 103. When pressure in the measurement passage 102 of the passage member 12 becomes atmospheric pressure, the diaphragm 40 contacts onto the end face 44 of the passage member 12, so that the diaphragm 40 returns to the standard position SPD shown in FIG. 2A. The bubble 110 simultaneously returns to the standard position SPB in the displacement passage 108 of the translucent passage member 16.

At step 202, the fuel injection valve 1, which is closed, is secured to the passage member 12 using the clamp (not shown). In this situation, the ON-OFF valve 30 is opened, so that the opening passage 103 is communicated with the atmosphere. Therefore, even pressure is applied in the measurement passage 102 when the fuel injection valve 1 is secured to the passage member 12, or even internal volume of the measurement passage 102 is changed, pressure is released to the atmosphere through the opening passage 103, so that the position of the diaphragm 40 does not change from the standard position SPD.

At step 204, the ON-OFF valve 30 is closed, so that the first measurement passage 100a of the measurement passage 100, which is on the side of the fuel injection valve 1, is airtightly closed.

At step 206, pressurized measurement fluid is supplied from the fluid supply apparatus 50 into the fuel injection valve 1, so that predetermined hydraulic pressure is applied in the fuel injection valve 1.

Figure 2B:
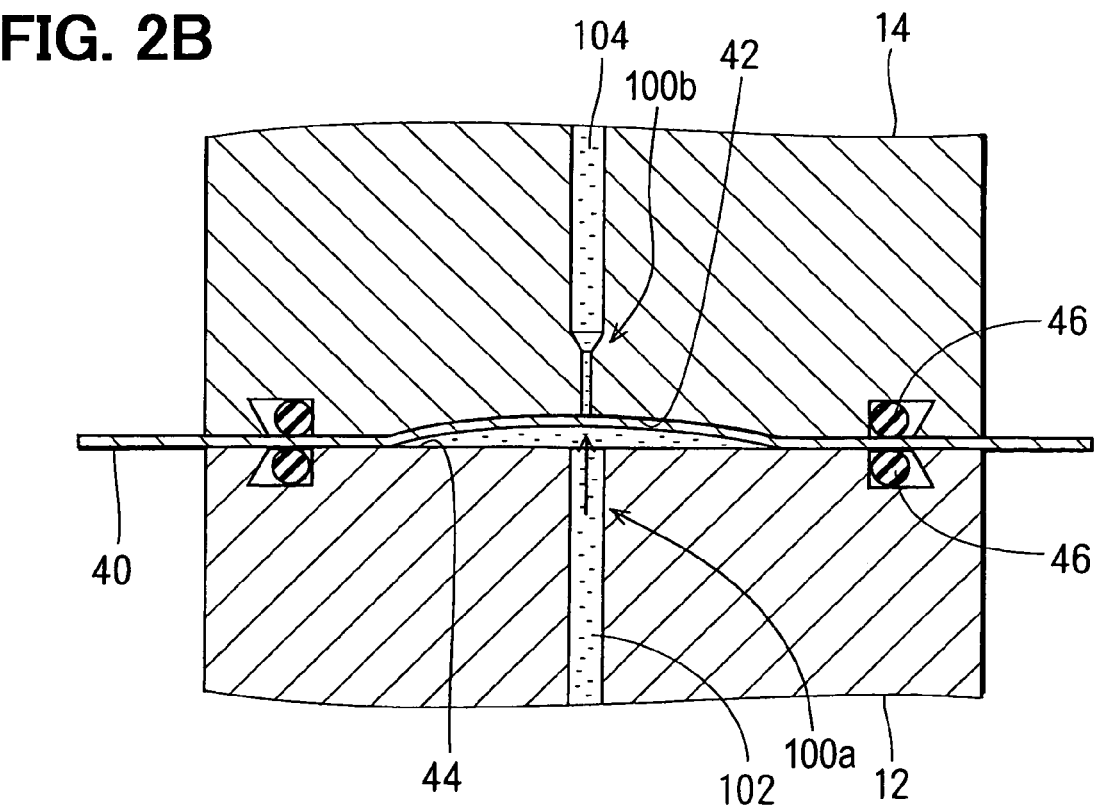
FIG. 2B is an enlarged cross-sectional side view showing the diaphragm after fluid flows out of an object to be measured.

At step 208, when the pressurized measurement fluid leaks out of the seat portion of the fuel injection valve 1, the pressurized measurement fluid flows into the measurement passage 102. In this situation, as shown in FIG. 2B, the diaphragm 40 displaces in accordance with leaking volume LV of fluid leaking out of the fuel injection valve 1 into the measurement passage 102. Specifically, the center portion of the diaphragm 40 is deformed, and is axially displaced to the side of the second measurement passage 100b, so that internal volume of the measurement passage 102 changes.

At step 210, the inner volume of the measurement passage 102 changes, and the diaphragm 40 displaces to the side of the measurement passage 104, i.e., to the side of the bubble 110, so that the bubble 110 displaces with the measurement fluid filled in the displacement passage 108 to the opposite side as the fuel injection valve 1.

At step 212, the procedure waits for a predetermined time.

At step 214, the fluid supply apparatus 50 stops applying hydraulic pressure into the fuel injection valve 1.

At step 216, the calculating device 62 calculates displacement DB of the bubble 110 in accordance with difference between the standard position SPB of the bubble 110 and the present position PPB of the bubble 110. The present position PPB of the bubble 110 is displayed on a display device or the like by a picture obtained using the camera 60.

At step 218, leaking volume LV of fluid is calculated based on the product of the displacement DB, which is the distance between the standard position SPB and the present position PPB of the bubble 110, and the cross-sectional area of the displacement passage 108.

At step 220, the calculated leaking volume LV is shown on the display device. When the calculated leaking volume LV is determined to be equal to or greater than a specific volume, i.e., threshold, the fuel injection valve 1 is determined to be a defective product.

At step 222, the ON-OFF valve 30 is opened, so that pressure in the measurement passage 102 is released to the atmosphere through the opening passage 103.

At step 224, when pressure in the measurement passage 102 of the passage member 12 becomes atmospheric pressure, the diaphragm 40 contacts onto the end face 44 of the passage member 12. That is, the diaphragm 40 returns to the standard position SPD shown in FIG. 2A.

At step 226, when the diaphragm 40 returns to the standard position SPD, the bubble 110 returns to the standard position SPB in the displacement passage 108 of the translucent passage member 16.

At step 228, the fuel injection valve 1 is detached from the measurement passage 102 of the passage member 12. In this situation, the ON-OFF valve 30 is opened, and pressure in the measurement passage 102 is released to the atmosphere. Therefore, even negative pressure is generated when the fuel injection valve 1 is detached from the passage member 12, the negative pressure is not applied in the measurement passage 102, so that the diaphragm 40 and the like can be protected from being damaged.

Subsequently, another fuel injection valve 1, which is another measured object, is prepared, and the above measurement procedure in steps 200 to 228 are repeated.

The ON-OFF valve 30 is opened, so that pressure in the measurement passage 102 is set to be the atmospheric pressure, and the position of the diaphragm 40 is set to be the standard position SPD in the fluid volume measuring apparatus 10, after finishing measurement of leaking volume LV. In this situation, the bubble 10 in the measurement fluid 120 returns to the standard position SPB in the displacement passage 108 regardless of fluid level of the fluid column 122 of the measurement fluid 120 filled in the manometer 20. Therefore, leaking volume LV can be precisely measured without waiting for completely returning of fluid adhering to the inner wall face of the manometer 20, which moves downwardly into the fluid column 122 when the diaphragm 0.40 returns to the standard position SPD. Thus, the fuel injection valve 1 can be replaced immediately after finishing one measurement work of leaking volume LV, and another measurement work of leaking volume LV can be successively repeated. As a result, an interval between measurement works of leaking volume LV can be significantly shortened. Besides, confirmation process of completely returning of the fluid adhering to the manometer 20 may be omitted, so that the measurement work can be uniformly performed in a short time.

Furthermore, when the ON-OFF valve 30 is opened, pressure in the measurement passage 102 is set to be the atmospheric pressure, and the diaphragm 40 contacts onto the end face 44 of the passage member 12. Therefore, the bubble 110 is not displaced to the side of the diaphragm 40 over the standard position SPB of the bubble 110.

Even when volume of fluid in the measurement passage 102 increases by a volume that is greater than the volume of the fluid chamber 105, the diaphragm 40 contacts onto the recession 42 of the passage member 14, so that the bubble 110 does not displace out of a predetermined measurement range. Furthermore, the diaphragm 40 may be protected by the recession 42 from excessive deformation. The diaphragm 40 contacts onto the restricting members, which are the end face 44 of the passage member 12 and the recession 42 of the passage member 14, in both axial directions, in which the diaphragm 40 axially displaces. Therefore, the range of displacement DB, in which the bubble 110 displaces in the second measurement passage 100b, can be limited to the predetermined measurement range defined in the displacement passage 108 formed in the translucent passage member 16.

The bubble 110 separates the measurement fluid filled in the second measurement passage 100b into two pieces of measurement fluid, in which the bubble 110 is inserted in the second measurement passage 100b. Therefore, the two pieces of measurement fluid can be restricted from communicating with each other through a gap formed between the inner wall of the displacement passage 108 and the bubble 110, so that leaking volume LV can be precisely measured.

When the displacement passage 108 has a polygonal cross sectional shape, a gap may be formed between the inner wall of the displacement passage 108 and the bubble 110, and the measurement fluid may by communicated with each other through the gap. On the contrary, the displacement passage 108 has a substantially circular cross section, so that the gap may not be formed between the inner wall of the displacement passage 108 and the bubble 110.

The camera 60 detects the position of the bubble 110, and the calculating device 62 calculates displacement DB of the bubble 110 in accordance with the position of the bubble 110 detected by the camera 60, so that leaking volume LV can be precisely measured within a short time.

The airtight case 22 encloses the opening side of the manometer 20 to seal the atmosphere on the opening side of the manometer 20 in the airtight case 22, so that fluctuation of pressure applied from the atmosphere to the bubble 110 can be restricted with a simple structure.

When the inner diameter of the displacement passage 108 becomes large, the bubble 110 may upwardly float in the displacement passage 108, and a gap may be formed between the inner wall of the displacement passage 108 and the bubble 110. The inner diameter of the displacement passage 108 is preferably determined to be equal to or less than 1 mm, so that the bubble may be restricted from upwardly floating.

Other Embodiment

The airtight case 22 may be omitted from the opening end side of the manometer 20 when flow and pressure fluctuation do not arise in the atmosphere on the opening end side of the manometer 20.

A laser displacement detecting device may be used as the detecting device instead of using the camera 60 to detect the position of the bubble 110.

A gauge, such as a measuring scale may be provided to the translucent passage member 16, so that displacement DB of the bubble 110 may be visually measured, i.e., displacement DB may be read using the gauge.

The displacement passage 108 may be vertically or slantly formed in the translucent passage member 16, instead of substantially horizontally forming the displacement passage 108 in the translucent passage member 16. When leaking volume LV is measured, the measurement passage 102 on the side of the fuel injection valve 1 with respect to the bubble 110 is closed, so that the bubble 110 does not displace even when the displacement passage 108 is slanted.

The number of the bubbles 110 may be two or more.

The bubble 110 may be formed of another gas instead of air, as long as the gas does not dissolve in the measurement fluid.

Partial displacement of the bubble 10, which is displacement of the bubble 10 from a predetermined intermediate position within a predetermined time, may be detected, and the leaking volume LV may be estimated based on the partial displacement. In this estimating method, displacement DB of the bubble 10 can be obtained in a short time compared with the above calculating method, in which leaking volume LV is calculated based on the difference between the standard position SPB and the present position PPB (final position) of the bubble 110.

The measured object is not limited to the fuel injection valve 1. The measured object may be another valve or a fluidic device that controls flow of fluid, which is not limited to fuel. The fluid volume measuring apparatus 10 may be used for measuring small volume of fluid flowing out of a measured object, instead of measuring leaking volume of fluid.

The translucent passage member 16 may be partially translucent only around the displacement passage 108. When the position of the bubble 10 is detected using another method such as detecting difference of capacitances of gas and fluid, or detecting the position of the bubble 10 using acoustic wave, the passage member 16 need not be translucent.

Various modifications and alternations may be diversely made to the above embodiments without departing from the spirit of the present invention.

What is claimed is:

1. A fluid volume measuring apparatus for measuring volume of fluid flowing out of an object to be measured, the fluid volume measuring apparatus comprising:
    a passage member that defines a measurement passage in which fluid, which fills the measurement passage, is capable of moving in accordance with volume of fluid flowing out of the object to be measured,
    wherein the fluid filled in the measurement passage defines a bubble,
    the passage member has a translucent portion in a range in which the bubble displaces in accordance with volume of fluid flowing out of the object to be measured; and
    volume of fluid is measured as a function of the displacement of the bubble.

2. The fluid volume measuring apparatus according to claim 1, wherein the bubble separates the fluid in the measurement passage into at least two volumes of fluid in which the bubble is inserted in the measurement passage.

3. The fluid volume measuring apparatus according to claim 1, wherein the measurement passage, which is defined in the translucent portion of the passage member, has a substantially circular cross section.

4. The fluid volume measuring apparatus according to claim 1, further comprising:
    a detecting device that detects a position of the bubble; and
    a calculating device that calculates volume of fluid, which flows out of the object to be measured, based on detected displacement of the bubble.

5. The fluid volume measuring apparatus according to claim 1, further comprising:
    a pressure maintaining means that is located on an opening side of the measurement passage, which is located on the opposite side as the object to be measured with respect to the bubble, to maintain pressure applied from an atmosphere to the fluid filled in the measurement passage on the opening side of the measurement passage at a substantially constant pressure.

6. The fluid volume measuring apparatus according to claim 5, wherein the pressure maintaining means encloses the opening side of the measurement passage to seal the atmosphere on the opening side of the measurement passage in the pressure maintaining means.

7. The fluid volume measuring apparatus according to claim 1, further comprising:
    a volume restricting means that partitions the measurement passage into a first measurement passage on the side of the object to be measured and a second measurement passage on the side of the bubble,
    wherein the volume restricting means restricts variation of volume of the first measurement passage that changes in accordance with volume of fluid flowing out of the object to be measured, and
    the volume restricting means restricts displacement of the bubble that displaces in accordance with variation of volume of fluid filled in the first measurement passage.

8. The fluid volume measuring apparatus according to claim 7, further comprising:
    a diaphragm that partitions the measurement passage into a first measurement passage on the side of the object to be measured and a second measurement passage on the side of the bubble; and
    a restricting member that restricts displacement of the diaphragm.

9. The fluid volume measuring apparatus according to claim 1, further comprising:

an opening and closing means that is capable of communicating and shutting a portion of the measurement passage, which is located between the object to be measured and the bubble, with respect to an atmosphere.

10. The fluid volume measuring apparatus according to claim 1, wherein the measurement passage, which is defined in the translucent portion of the passage member, has an inner diameter that is equal to or less than 1 mm.

11. A method for measuring a volume of fluid flowing out of an object to be measured, the fluid volume measuring method comprising:

opening an opening and closing means to communicate a measurement passage, which is filled with fluid, with an atmosphere so that pressure in the measurement passage becomes atmospheric pressure, and a bubble location in the fluid filled in the measurement passage returns to a standard position;

securing an object to be measured to the measurement passage;

closing the opening and closing means to airtightly enclose the measurement passage;

supplying pressurized fluid to the object to be measured to apply predetermined pressure in the object to be measured; and measuring the volume of fluid by detecting the displacement of the bubble from the standard position.

12. The fluid volume measuring method according to claim 11 further comprising the step of:

calculating volume of fluid, which flows out of the object to be measured, based on the displacement of the bubble.

13. The fluid volume measuring method according to claim 12 further comprising the step of:

determining whether the calculated volume of fluid, which flows out of the object to be measured, is greater than a threshold.

14. The fluid volume measuring method according to claim 11 further comprising the step of:

opening the opening and closing means to release pressure in the measurement passage to the atmosphere so that the bubble returns to the standard position in the measurement passage.

15. The fluid volume measuring method according to claim 14 further comprising the step of:

detaching the object to be measured from the measurement passage after opening the opening and closing means.

16. The fluid volume measuring method according to claim 11, wherein the measurement passage including the bubble is defined in a member that is at least partially translucent.

* * * * *